Figure 1:
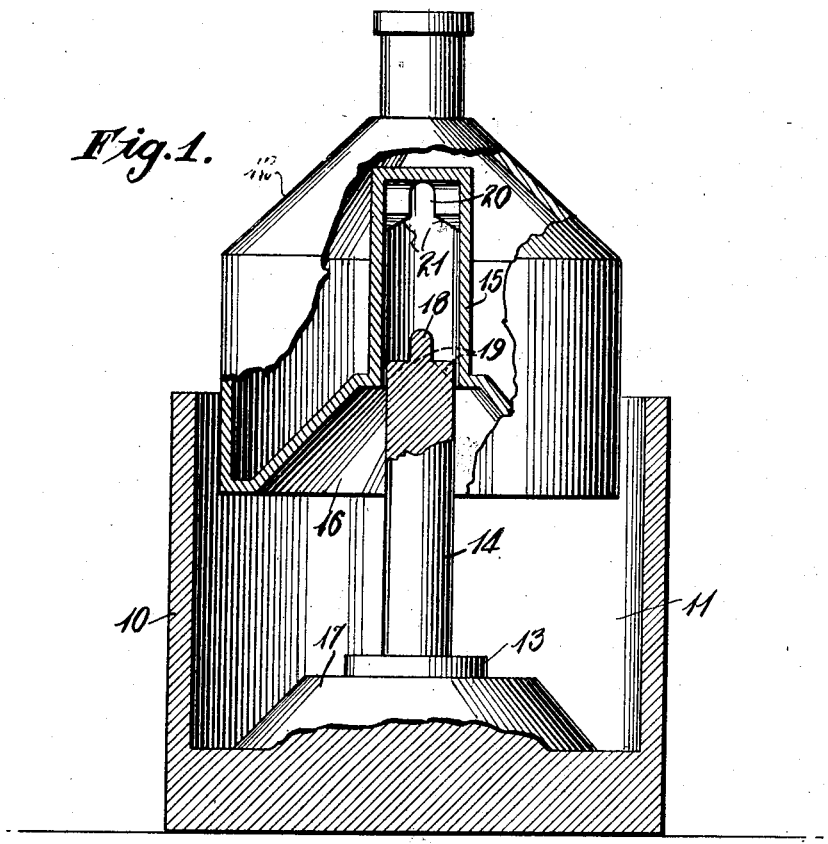

Sept. 22, 1925.

R. IRWIN

CREAM SEPARATOR

Filed Nov. 28, 1922

1,554,433

Inventor

Roy Irwin

By

Attorney

Patented Sept. 22, 1925.

1,554,433

UNITED STATES PATENT OFFICE.

ROY IRWIN, OF ST. PAUL, MINNESOTA.

CREAM SEPARATOR.

Application filed November 28, 1922. Serial No. 603,884.

*To all whom it may concern:*

Be it known that ROY IRWIN, a citizen of the United States, residing at St. Paul, in the county of Ramsey and State of Minnesota, have invented certain new and useful Improvements in Cream Separators, of which the following is a specification.

This invention relates to cream separators and particularly to improved means for seating the bowl of the separator.

An important object of the invention is to provide means whereby the bowl of the separator will be automatically directed to its seat upon the spindle of the bowl chamber, the said directing means embodying elements carried respectively by the bowl and the spindle for co-operative engagement with each other.

Various other objects and advantages of the invention will become apparent from the following disclosure.

Figure 2:
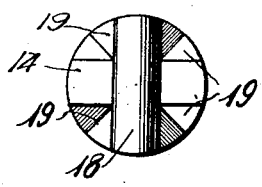
Figure 3:
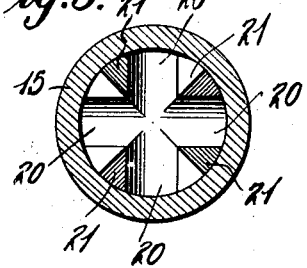
Figure 4:
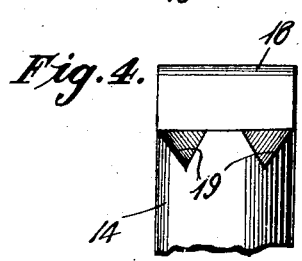

In the drawing:

Figure 1 is a sectional view of a cream separator illustrating the application of the invention thereto, Figure 2 is a top plan view of the bowl spindle, Fig. 3 is a detailed view of the spindle socket of the separator bowl, and Fig. 4 is a view, in side elevation, of the upper end of the bowl spindle.

Describing the invention in detail, 10 designates the frame of a cream separator presenting a bowl chamber 11 for the reception of the separator bowl 12. Provided on the bottom of bowl chamber 11 is a spindle bearing 13 which accommodates one end of the vertical spindle 14. Any suitable and desired mechanism may be employed for driving spindle 14. For example, the driving means may be similar to that illustrated and described in United States Patent #1,242,866, granted Oct. 9, 1917; it being understood that spindle 14 of the present device extends below the separator bowl 10 in the usual and customary manner. The upper end of this spindle is received in a socket 15 of the bowl, the latter being of hollow construction as illustrated in Figure 1. In the lowermost position of the bowl, the funnel shaped portion 16 of the latter seats on the flared base 17 of the bowl chamber and co-operating elements are provided on the spindle and spindle socket respectively for directing the bowl to its seat.

In providing the spindle with directing elements, the upper end of the spindle is shouldered to provide tongue 18 flanked on opposite sides by two V-shaped recesses 19 cut into the shoulder of the spindle at each end as shown in Figures 2 and 4. The bottom of socket 15 is provided with transverse grooves intersecting each other at right angle to provide a pair of seats 20 for tongue 18 of the spindle. Arranged in the four angles of the intersecting grooves are V-shaped projections 21, preferably four in number as shown and disposed in advance of the tongue seats 20. These projections are adapted to be received in the V-shaped recesses of the spindle and each projection presents sloping sides and an inclined edge which automatically directs the tongue of the spindle into one of the seats 20. It is obvious that if the bowl does not happen to be correctly positioned at the time it is being engaged over the spindle, to center one of the seats 20 with the tongue 18, the latter will at least strike against relatively opposite sloping sides of diagonally located projections 21, with the result that the bowl will be caused to turn, as it moves downwardly, so that the tongue will seat in aligned grooves 20; the projections seating themselves within the V-shaped recesses of the spindle. The engagement of the V-shaped projections in the recesses of the spindle serves to hold the bowl firmly upon the spindle and to provide for the snug engagement of the tongue with its seat, the bottom of which may be rounded out in conformity with the rounded edge of the tongue. It will thus be observed that the sloping edges of the projections and recesses serve to properly position the bowl upon the spindle and at the same time permit the members to be conveniently disengaged whenever required for any purpose.

From the foregoing it is thought that the advantages and novel features of the invention will be readily understood and that further detail description is not required.

What is claimed is:

1. An automatic bowl-seating device for cream separators comprising a spindle shouldered at its upper end to provide a bearing tongue, a bowl having a bearing socket engageable over the said tongue and presenting transverse grooves intersecting at right angles to provide separate seats for the said tongue, and guides arranged in the angles of the intersecting grooves for engaging and directing the said tongue into one or the other of the said seats.

2. An automatic bowl-seating device for cream separators comprising a spindle shouldered at its upper end to provide a bearing tongue and having recesses formed in the shoulder on opposite sides of the tongue adjacent each end thereof, a bowl having a bearing socket engageable over the said tongue and presenting transverse grooves intersecting at right angles to provide separate seats for the said tongue and guides arranged in the angles of the intersecting grooves for engaging and directing the tongue into one or the other of the said seats, said guides being adapted to seat in the recesses of the said spindle.

3. An automatic bowl-seating device for cream separators comprising a spindle shouldered at its upper end to provide a bearing tongue and having V-shaped recesses formed in the shoulder on opposite sides of the said tongue near each end thereof, a bowl having a bearing socket engageable over the said tongue and presenting traverse grooves intersecting at right angles to provide separate seats for the said tongue, and V-shaped guides arranged in the angles of the intersecting grooves and presenting sloping walls for engaging and guiding the tongue into one or the other of the said seats, said V-shaped guides being adapted to seat in the V-shaped recesses of the spindle.

In testimony whereof I affix my signature.

ROY IRWIN.